US009034213B2

United States Patent
Hersam et al.

(10) Patent No.: US 9,034,213 B2
(45) Date of Patent: May 19, 2015

(54) SEPARATION OF SINGLE-WALLED CARBON NANOTUBES BY ELECTRONIC TYPE USING BLOCK COPOLYMERS

(75) Inventors: Mark C. Hersam, Wilmette, IL (US); Alexander L. Antaris, Evanston, IL (US); Alexander A. Green, Boston, MA (US)

(73) Assignee: Northwestern University, Evanston, IL (US)

( * ) Notice: Subject to any disclaimer, the term of this patent is extended or adjusted under 35 U.S.C. 154(b) by 312 days.

(21) Appl. No.: 13/134,167

(22) Filed: May 31, 2011

(65) Prior Publication Data
US 2012/0025150 A1    Feb. 2, 2012

Related U.S. Application Data

(60) Provisional application No. 61/396,555, filed on May 28, 2010.

(51) Int. Cl.
*B82B 3/00* (2006.01)
*B82Y 30/00* (2011.01)
*B82Y 40/00* (2011.01)
*C01B 31/00* (2006.01)
*B03D 3/00* (2006.01)
*C01B 31/02* (2006.01)

(52) U.S. Cl.
CPC ............... *B82Y 30/00* (2013.01); *B82B 3/0071* (2013.01); *B03D 3/00* (2013.01); *B82Y 40/00* (2013.01); *C01B 31/0266* (2013.01); *C01B 2202/02* (2013.01); *C01B 2202/22* (2013.01); *C01B 2202/36* (2013.01); *Y10S 977/742* (2013.01); *Y10S 977/845* (2013.01)

(58) Field of Classification Search
CPC ...... B82B 3/0071; B82Y 30/00; B82Y 40/00; C01B 31/02
USPC .............. 252/500–511; 423/447.1; 210/749; 977/742, 845
See application file for complete search history.

(56) References Cited

U.S. PATENT DOCUMENTS

| | | | |
|---|---|---|---|
| 7,662,298 B2 | 2/2010 | Hersam et al. | |
| 2009/0123752 A1* | 5/2009 | Prud'homme et al. | 428/402 |
| 2009/0173918 A1 | 7/2009 | Hersam et al. | |
| 2009/0324483 A1 | 12/2009 | Doorn et al. | |
| 2010/0044230 A1* | 2/2010 | Papadimitrakopoulos et al. | 204/547 |
| 2010/0111814 A1 | 5/2010 | Doorn et al. | |
| 2011/0037033 A1* | 2/2011 | Green et al. | 252/510 |
| 2011/0048277 A1* | 3/2011 | Sivarajan et al. | 106/31.13 |
| 2011/0203632 A1* | 8/2011 | Sen et al. | 136/244 |

FOREIGN PATENT DOCUMENTS

JP    2010001162    1/2010

OTHER PUBLICATIONS

Green et al. ("Ultracentrifugation of single-walled nanotubes." Materials Today, 10(12), p. 59-60, 2007).*

(Continued)

*Primary Examiner* — Tri V Nguyen
(74) *Attorney, Agent, or Firm* — Reinhart Boerner Van Deuren s.c.

(57) ABSTRACT

The separation of single-walled carbon nanotubes (SWNTs), by electronic type using centrifugation of compositions of SWNTs and surface active block copolymers in density gradient media.

27 Claims, 5 Drawing Sheets

(56) References Cited

OTHER PUBLICATIONS

Moore et al. ("Individually Suspended Single-Walled Carbon Nanotubes in Various Surfactants." NanoLetters, 3(10),p. 1379-1382, Online Sep. 9, 2003).*

A. Green and M. Hersam, "Processing and properties of highly enriched double-wall carbon nanotubes", Nature Nanotechnology, vol. 4., Jan. 2009.

A. Green and M. Hersam, "Colored Semitransparent Conductive Coatings Consisting of Monodisperse Metallic SingleWalled Carbon Nanotubes", Nano Letters, 2008, vol. 8, No. 5, 1417-1422.

Antaris, Alexander L., et al. "Sorting Single-Walled Carbon Nanotubes by Electronic Type Using Nonionic, Biocompatible Block Copolymers", ACS NANO, 2010, 4(8), 4725-4732, Jul. 29, 2010. See the whole document.

PCT Search Report from PCT/US2011/000979 issued May 31, 2012.

Poloxamer—Wikipedia, the free encyclopedia, printed from http://en.wikipedia.org/wiki/Poloxamer on May 31, 2011.

* cited by examiner

SEPARATION OF SINGLE-WALLED CARBON NANOTUBES BY ELECTRONIC TYPE USING BLOCK COPOLYMERS

This application claims priority benefit from application Ser. No. 61/396,555 filed May 28, 2010, the entirety of which is incorporated herein by reference.

This invention was made with government support under Grant No. W911NF-09-1-0233 awarded by the Army Research Office, Grant Nos. EEC-0647560, DMR-0520513, and DMR-0706067 awarded by the National Science Foundation. The government has certain rights in the invention.

BACKGROUND OF THIS INVENTION

The production of carbon nanotubes with controlled atomic and electronic structure has led to devices with improved performance and functionality, and enabled a more detailed understanding of the physical properties of these one-dimensional nanomaterials. Despite the many benefits, it remains a considerable challenge to generate carbon nanotubes with controlled structure. Synthetic methods can achieve some degree of control over the distribution of nanotube chiralities and their electronic type. For instance, single-walled carbon nanotubes (SWNTs) are typically synthesized with a statistical two-to-one ratio of semiconducting to metallic species. However, this polydispersity has hindered the development of many nanotube-based technologies and further improvements are required to optimize device performance. To address this issue, a number of post-synthesis methods of separating carbon nanotubes according to their diameter, wrapping angle, and electronic type (metallic versus semiconducting) have been developed. For instance, a large number of polymers and biomolecules, such as PFO, single-stranded DNA, and flavin mononucleotide, adopt structure-dependent configurations around SWNTs, which can be exploited to enable isolation according to SWNT structure. The SWNT structural specificity of these molecules is generally attributed to their ability to self-associate and form sheath-like structures that conform with the atomic structure of a given SWNT species.

One of the leading methods for separating SWNTs is density gradient ultracentrifugation (DGU). Without limitation, this technique exploits differences in the buoyant density of SWNTs encapsulated by surfactants, which translate into differences in the position of the SWNTs once subjected to high centripetal forces in density gradients. Previous work has shown, for instance, that by simply changing the levels of anionic co-surfactants sodium cholate and sodium dodecyl sulfate present in a density gradient, it is possible to isolate SWNTs according to diameter and/or electronic type with purity levels for the latter exceeding 99%. Despite some experimental and theoretical study, the surfactant-SWNT interactions that enable DGU separations, particularly those by electronic type, are not well understood. This limited understanding is due in part to the difficulty in faithfully simulating a typical DGU experiment, which involves the complex interplay between SWNTs, different mixtures of competing surfactant species, counterions, water molecules, and density gradient media.

In the absence of detailed theoretical understanding, improving the fidelity and yield of DGU separations will remain an often laborious process. Accordingly, there remains an on-going effort in the art to develop a nanotube separation system to better understand and utilize the benefits available through DGU.

SUMMARY OF THE INVENTION

In light of the foregoing, it is an object of the present invention to provide one or more methods and/or systems relating to the separation of carbon nanotubes, thereby overcoming various deficiencies and shortcomings of the prior art, including those outlined above. It will be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

It can be another object of this invention to provide methods and related systems for carbon nanotube separation as a function of electronic type, regardless of diameter and/or chirality.

It can be another object of this invention to provide a range of polymeric surface active components and use thereof to engineer differences in nanotube buoyant densities, such that a mixture of nanotubes can be separated as a function of electronic type.

It can be another object of this invention to provide a range of surface active block copolymers that can be rationally designed and tailored to control and/or enhance separation of single-walled carbon nanotubes by electronic type.

It can be another object of this invention, alone or in conjunction with one or more of the preceding objectives, to provide a biocompatible block copolymer, such that selectively separated carbon nanotubes can be utilized in various in vivo applications.

Other objects, features, and advantageous of the present invention will be apparent from the summary and the following descriptions of certain embodiments, and will be readily apparent to those skilled in the art knowledgeable regarding the production and properties of carbon nanotubes and related separation techniques. Such objects, features, benefits and advantages will be apparent from the above as taken into conjunction with the accompanying examples, data, figures and all reasonable inferences to be drawn there from, alone or with consideration of the references incorporated herein.

In part, this invention can be directed to a method of using a density gradient to separate carbon nanotubes. Such a method can comprise providing a fluid medium comprising a density gradient; contacting such a medium and a composition comprising a mixture of single-walled carbon nanotubes of varying electronic type (i.e., semiconducting or metallic), and a surface active block copolymeric component; and centrifuging the medium and composition for a time and/or rotational rate at least partially sufficient to separate the nanotube mixture along a medium gradient. Such a method is without limitation as to nanotube identity, whether a mixture of chiralities, diameters or otherwise. The nanotubes selectively separated and/or isolated can be identified spectrophotometrically and/or fluorimetrically, with such identification comprising comparison of absorbance and/or emission spectra respectively with a corresponding reference spectrum.

The carbon nanotubes can be provided in composition with a nonionic, block copolymer component of the sort understood by those skilled in the art made aware of this invention. Generally, such a component can function, in conjunction with a particular fluid medium, to reduce nanotube aggregation. In certain embodiments, such a component can be selected from a wide range of nonionic amphiphiles. In certain such embodiments, such a component can be selected from various linear block poly(alkylene oxide) copolymers. In certain such embodiments, such poly(alkylene oxide)

copolymer components can be X-shaped and/or coupled with a linker such as but not limited to an alkylene diamine moiety. Regardless, without limitation, such copolymer components can comprise poly(ethylene oxide) (PEO) and poly(propylene oxide) (PPO) blocks, as discussed more fully, below. More generally, such embodiments are representative of a broader group of polymeric surface active components capable of providing a structural configuration about and upon dynamic interaction with carbon nanotubes in a fluid medium, as can induce differential nanotube buoyant density.

Fluid media useful with this invention are limited only by carbon nanotube aggregation therein to an extent precluding at least partial separation. Accordingly, without limitation, aqueous and non-aqueous fluids can be used in conjunction with any substance soluble or dispersible therein, over a range or with a plurality of concentrations so as to provide the medium a density gradient for use in the separation techniques described herein. Such substances can be ionic or non-ionic, non-limiting examples of which include inorganic salts and alcohols, respectively. In certain embodiments, as illustrated more fully below, such a medium can comprise a plurality and/or range of aqueous iodixanol concentrations and a corresponding gradient of concentration densities. Likewise, the methods of this invention can be influenced by gradient slope, as affected by length of centrifuge compartment and/or angle of centrifugation.

Regardless of medium identity or density gradient, composition contact can comprise introducing one or more of the aforementioned nanotube compositions on or at any point within the gradient, before centrifugation. In certain embodiments, such a composition can be introduced at a position along the gradient which can be substantially invariant over the course of centrifugation. Such an invariant point can be advantageously determined to have a density corresponding to about or approximating the buoyant density of the nanotube composition(s) introduced thereto.

Upon sufficient centrifugation, at least one fraction of the medium or nanotube mixture can be separated and/or isolated from the medium, such fraction(s) as can be isopycnic at a position along the gradient. An isolated fraction can correspond to nanotubes produced by one or more techniques known in the art, identified by dimension, chirality, chemical characteristic or electronic type corresponding thereto. Regardless, any such medium and/or nanotube fraction can be used, or optionally reintroduced to another fluid medium, for subsequent refinement or separation. Accordingly, such a method of this invention can comprise repeating or iterative centrifuging, separating and isolation. In certain embodiments, medium conditions or parameters can be maintained from one separation to another. In certain other embodiments, however, at least one iterative separation can comprise a change of one or more parameters, such as but not limited to the identity of the surface active component(s), medium identity, medium density gradient and/or various other medium parameters with respect to one or more of the preceding separations.

In part, the present invention can also be directed to a method of using a surface active block copolymeric component to alter carbon nanotube buoyant density and effect separation thereof. Such a method can comprise providing a fluid medium comprising a density gradient; providing a composition comprising a mixture of single-walled carbon nanotubes varying at least by electronic type, and at least one surface active block copolymeric component, to provide differential buoyant density; contacting such a medium and composition mixture; centrifuging the medium and composition for a time and/or at a rotational rate at least partially sufficient to separate the mixture by buoyant density along a gradient; and selectively separating by electronic type one group or fraction of the nanotube mixture from the medium. Useful fluid medium and substances incorporated therein, together with surface active components, can be as described elsewhere herein. With regard to the latter, and but one distinction over the prior art, differential buoyant density can be altered or modulated by a single surface active component, such contact and/or interaction as can be a function of electronic type.

Where such nanotubes comprise varying diameters and/or at least two chiralities, the selection can comprise iterative centrifugation, separation and isolation, to further partition the nanotubes along a gradient. In so doing, at least one such separation can vary by change in surface active component, medium identity, medium density gradient, and/or various other medium parameters, from one or more of the preceding separations.

Regardless, such a block copolymeric component can be of the sort discussed herein and/or illustrated more fully below. In certain such embodiments, such a component can comprise hydrophilic and hydrophobic poly(alkylene oxide) blocks. Without limitation, whether or not coupled by an alkylene diamine linker moiety, such copolymer components can comprise hydrophilic PEO and hydrophobic PPO blocks. In certain such embodiments, separation by electronic type can be enhanced by increasing hydrophilic block length (e.g., up to about 40-about 50 or more ethylene oxide units per block) relative to hydrophobic block length. From another perspective, electronic-type purity and separation efficiency can be inversely related to hydrophobic block length.

In part, the present invention can also be directed to a system for separation of carbon nanotubes. Such a system can comprise a fluid density gradient medium, and a composition comprising at least one surface active block copolymer component and single-walled carbon nanotubes comprising semiconducting and metallic electronic types, with the nanotubes positioned along the gradient of the medium. Independent of mixed chirality, diameter or any other structural or physical characteristic, such a system can comprise and be used to selectively separate semiconducting and metallic carbon nanotubes. Regardless, a fluid density gradient medium and a surface active component can be independently selected in view of the considerations discussed elsewhere herein.

Accordingly, without limitation, such a composition can comprise a mixture of single-walled nanotubes and an alkylene diamine-linked poly(alkylene oxide) block copolymer component. In certain embodiments, such a copolymer component can comprise PEO and PPO blocks coupled by an ethylene diamine linker moiety. Without limitation, such a polymeric component can comprise more than about 10-about 15 or more monomeric ethylene oxide units per PEO block. Such a composition can be incorporated into a fluid density gradient medium and/or a fraction thereof. Regardless, the nanotube component can be isolated for further analysis and/or incorporated into an electronics device or used in vivo, as would be understood by those skilled in the art made aware of this invention.

DESCRIPTION OF CERTAIN EMBODIMENTS

Figure 1:
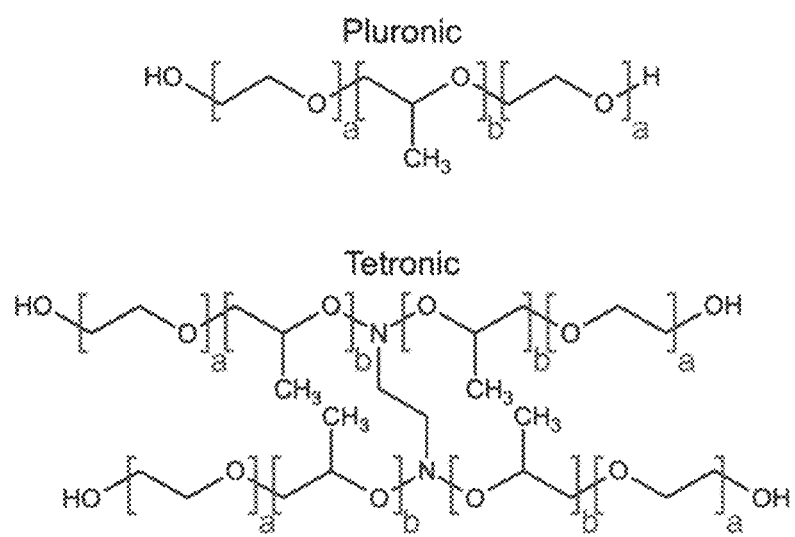
FIG. 1. Chemical structures of representative Pluronic® and Tetronic® block copolymers, in accordance with certain non-limiting embodiments of this invention.

Illustrating various non-limiting embodiments of this invention, a detailed series of DGU electronic type separations was conducted in a surfactant-SWNT system more tractable to theoretical modeling. Such representative separations employ two distinct classes of non-ionic block copolymers that have been widely studied theoretically outside the context of DGU: Pluronic® and Tetronic®-type block copolymers. Pluronics are linear molecules composed of a central hydrophobic polypropylene oxide (PPO) group flanked by two hydrophilic polyethylene oxide (PEO) chains (FIG. 1). Tetronics, on the other hand, are X-shaped copolymers formed by four individual PPO-PEO blocks bonded to a central ethylene diamine linker (FIG. 1). Unlike the anionic surfactants typically employed in DGU separations of the prior art, both block copolymer classes are available in a large number of different structural permutations established through independent control of their terminal moieties, hydrophilic and hydrophobic chain lengths. Pluronic-SWNT suspensions have generated recent interest due to their biocompatibility, self-assembly, and amenability to theoretical modeling. Previous studies have shown that the dispersion efficiency of a Pluronic depends strongly on the relative lengths of the PEO and PPO copolymer segments and that the hydrophobic PPO chains adhere to the SWNT surface while the hydrophilic chains extend into solution.

Beyond providing a more theoretically tractable DGU system, the present results also shed light on the interactions between block copolymers and SWNTs. The buoyant density of the polymer-SWNT complex varies as a function of the diameter, wrapping angle, electronic type, and bundling of the SWNTs; the ordering and surface coverage of the polymer on the SWNT sidewalls; and the organization of water and hydrophilic polymer regions in the outer region of the complex. Following DGU, the buoyant density of the separated SWNTs can be measured directly and their chirality distribution determined spectroscopically. Hence, DGU provides an exquisitely sensitive platform upon which to test polymer-SWNT interactions, particularly as a function of SWNT diameter and, as demonstrated below, Pluronics and Tetronics have an affinity for SWNTs of different electronic types— semiconducting and metallic, respectively. Furthermore, the yield and purity of the SWNTs extracted following separations vary systematically with the block copolymer structure, e.g., reaching purities greater than 99% semiconducting SWNTs for a certain Pluronic copolymer. These results show that such block copolymers represent a class of dispersion agents for DGU-based SWNT separations with structures that can be rationally tailored to enhance the degree of SWNT enrichment.

DGU-based separations of arc discharge-grown SWNTs were first performed with Pluronic block copolymers at a concentration of 1% w/v in density gradients generated using iodixanol. A homogeneous loading of polymer throughout the density gradient was utilized for Pluronic-SWNT separations, with the absence of polymer in the gradient tending to induce flocculation of most of the SWNTs during ultracentrifugation. This behavior is consistent with a polymer coating model of the SWNTs by the Pluronic in which the polymer units adsorbed to the nanotube are dynamically replaced by free polymer in the solution. Such interactions are quite unlike the wrapping configurations favored by other chain-like macromolecules such as single-stranded DNA, which have been shown in the prior art to be difficult to detach from the SWNT sidewalls.

Figure 2:
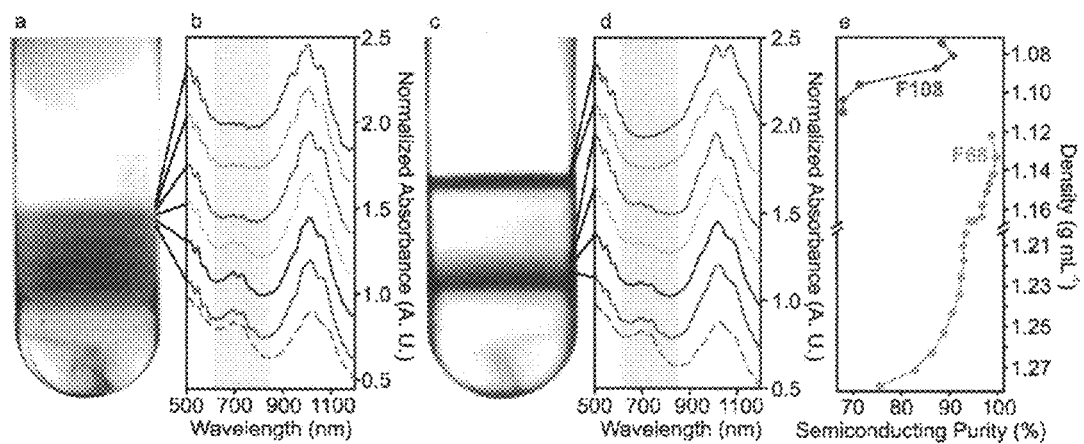
FIGS. 2A-E. Separation of SWNTs using Pluronics. A, C: Photographs of centrifuge tubes following DGU separations with Pluronic F108 (A) and F68 (C). B, D: Optical absorbance spectra of SWNTs extracted in the centrifuge tube at the locations labeled by black lines for Pluronic F108 (B) and F68 (D) separations. Dashed gray curves are the absorbance of unsorted SWNTs. The absorbance of metallic SWNTs in the blue shaded region changes as a function of the location in the centrifuge tube and indicates enrichment of semiconducting SWNTs. E: Semiconducting SWNT purity level as a function of SWNT buoyant density for Pluronic F108 and F68 separations.

Following Pluronic-SWNT separations, multiple bands could be observed in the centrifuge tubes although their position, composition, and intensity varied considerably depending on the Pluronic used. FIGS. 2A and C are photographs of the centrifuge tubes after separations using Pluronic F108 and F68, two polymers that differ in both their PEO and PPO chain lengths. Immediately obvious are the differences in banding in both centrifuge tubes. Whereas the separation with Pluronic F108 results in a broad brown banding region with some variations in intensity down the tube, the separation with Pluronic F68 yields only two distinct reddish bands separated by over 1 cm. The separated Pluronic-SWNT bands were fractionated layer by layer and characterized using optical absorbance spectroscopy.

Using these optical absorbance measurements, it is possible to map the composition of the Pluronic encapsulated SWNTs as a function of their position in the centrifuge tube, and hence their buoyant density. Without limitation and solely for purpose of demonstration, the arc discharge-synthesized SWNTs used in these experiments have diameters ranging from 1.2-1.7 nm with an average diameter of 1.5 nm. This diameter range produces absorbance peaks corresponding to semiconducting second order transitions between 900-1270 nm and first order metallic transitions between 600-850 nm. As a result, the electronic type purity of the SWNTs can be determined by comparing the areas under the metallic and semiconducting absorbance peaks with reference to an unsorted SWNT sample with a known composition. (Green, A. A.; Hersam, M. C., Colored semitransparent conductive coatings consisting of monodisperse metallic single-walled carbon nanotubes. *Nano Lett.* 2008, 8, (5), 1417-1422.) In addition, variations in the diameter distribution of the SWNTs can be determined by changes in the wavelengths of the SWNT transitions as the energies of these excitations are inversely related to the SWNT diameter.

The optical absorbance spectra obtained from the main areas of interest in the Pluronic F108 and F68 separations are shown in FIGS. 2B and D, respectively. Both polymers display a strong affinity for semiconducting SWNTs in the more buoyant fractions as evidenced by strongly suppressed first order metallic transitions. The Pluronic F68 separation shows much stronger specificity for semiconducting SWNTs with the best fractions reaching greater than 99% purity, compared to ~90% for Pluronic F108. Once the peak purity level is reached in both separations, the semiconducting purity decreases monotonically with increasing buoyant density until the SWNT composition is essentially identical to that of the unsorted SWNTs at 67% purity (FIG. 2E). The Pluronic F68 separation also exhibits some diameter enrichment in the most buoyant fractions; however, this effect is less than optimal by comparison with DGU-based SWNT separations of the prior art employing anionic surfactants or DNA.

To better understand the source of differences in Pluronic F108 and F68 separations, a series of DGU experiments was performed on thirteen additional Pluronic polymers, seven of which could stably encapsulate SWNTs under the conditions of ultracentrifugation. Of the seven DGU-compatible Pluronics, all contain individual hydrophilic PEO chains longer than approximately 50 monomer units, suggesting that Pluronics with shorter hydrophilic chain lengths tend to produce polymer-SWNT complexes of bundled SWNTs that are too dense for DGU processing or that shorter hydrophilic chains provide insufficient steric hindrance to prevent the SWNTs from rebundling during DGU.

Figure 3:
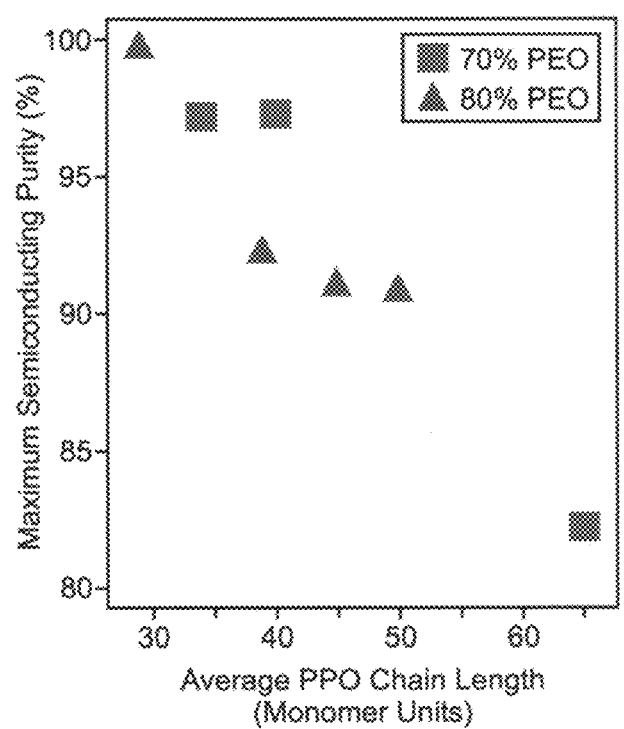
FIG. 3. The maximum attainable semiconducting SWNT purity level increases as the length of the hydrophobic PPO segment decreases. Pluronics with names ending in 7 and 8 consist of 70% and 80% PEO by molecular weight, respectively. More generally, letter and numerical designations of such block copolymers are well-known to those skilled in the art and correlated with physical form, hydrophobe molecular weight and hydrophile percent content.

Table 1 summarizes the principal findings of this survey of Pluronic separations. Firstly, the maximum purity of the semiconducting SWNTs separated using the Pluronics is inversely related to the hydrophobic PPO chain length. Pluronic F127 (average PPO chain of 65 monomers) extracted a maximum semiconducting purity of 82% while F68 (average PPO chain of 29 monomers) yielded purities greater than 99%. Those Pluronics with intermediate PPO lengths also largely follow this trend (FIG. 3). Secondly, decreasing the average number of hydrophobic PPO monomers resulted in greater semiconducting SWNT extraction efficiencies. For these separations, the extraction efficiency is defined as the percentage of the total semiconducting SWNTs originally inserted into the density gradient that were extracted at given semiconducting purity level after ultracentrifugation. Consequently, smaller PPO chain lengths not only produced higher purity material but were also more efficient at capturing the sorted semiconducting SWNTs from the starting SWNT mixture. Deviations from the above trends were observed for a few of the Pluronics and are likely due to differences in the ratio of hydrophilic to hydrophobic chain lengths.

Investigation of the family of Pluronics also revealed that the general buoyant density-structure relationship in the Pluronic-SWNTs can be one of two types as suggested in FIGS. 2A and C. Pluronic F68, and F77, the only DGU-compatible Pluronics with PPO chain lengths shorter than approximately 35 monomers, produced a relatively clear density gradient straddled by an isolated high purity semiconducting SWNT band above and a more heterogeneous SWNT band below. By contrast, separations with the other Pluronics featured a high purity semiconducting SWNT region resting directly above the lower purity fractions. Lowering the concentration of Pluronic F108 used during ultrasonication and the subsequent separation could also yield a bimodal density-structure relationship. F108 separations at 0.3% w/v loading resulted in maximum semiconducting purities of 94% in the isolated band, which corresponds to a 4% increase in purity compared to the 1% w/v loading separation. The increase in purity at a low Pluronic concentration, however, was offset by a large decrease in extraction efficiency.

The observations above suggest that Pluronics can adopt two different configurations on the surface of the SWNTs. The single-mode buoyant density-structure relationships observed in the long PPO chain Pluronics are likely caused by a disordered arrangement of polymer about the SWNTs. In this case, the individually encapsulated SWNTs have a similar polymer arrangement as bundled SWNTs, which cause them to have comparable buoyant densities despite substantial structural differences. This effect can be seen in the absorbance spectra of FIG. 2B. The more buoyant individual SWNTs exhibit sharper peaks compared to the denser, bundled SWNTs whose peaks are broader and red-shifted—both spectroscopic signs of increased bundling. In contrast, Pluronic-SWNT systems that exhibit bimodal density-structure relationships likely have a subset of low buoyant density SWNTs that are coated by ordered polymer layers. Such ordered Pluronic arrangements are suggested by the high electronic type sensitivity shown by F68, which is unlikely to be obtained without strong polymer-SWNT interactions, and their tight buoyant density distribution compared to the lower purity SWNTs, which indicates a well-defined and reproducible polymer arrangement. Furthermore, the variations in the buoyant density distribution as a function of Pluronic F108 concentration demonstrate that the bimodal SWNT density distribution is sensitive to the levels of free polymer in solution. This behavior is likely caused by a large excess of polymer at higher loadings that increases the likelihood of random initial polymer adsorption at multiple points on the SWNTs, which in turn frustrates ordered polymer assembly. At low Pluronic loadings, random polymer adsorption is less likely to occur, enabling ordered arrangements to form.

TABLE 1

Pluronic semiconducting SWNT sorting efficiency

| Pluronic | PEO[a] | PPO[b] | MW[c] | Isolated Semi. Band | Buoyant Density[d] (g/mL) | Maximum Purity (%) | Semiconducting SWNT Extraction Efficiency | | | | |
|---|---|---|---|---|---|---|---|---|---|---|---|
| | | | | | | | >80% | >85% | >90% | >95% | ≥99% |
| F127 | 100 | 65 | 12600 | N | 1.11 | 82 | 0.8 | 0 | 0 | 0 | 0 |
| F108 | 133 | 50 | 14600 | N | 1.11 | 90 | 6.6 | 4.9 | 1.4 | 0 | 0 |
| F98 | 118 | 45 | 13000 | N | 1.11 | 91 | 7.2 | 4.1 | 1.8 | 0 | 0 |

TABLE 1-continued

Pluronic semiconducting SWNT sorting efficiency

| Pluronic | PEO[a] | PPO[b] | MW[c] | Isolated Semi. Band | Buoyant Density[d] (g/mL) | Maximum Purity (%) | Semiconducting SWNT Extraction Efficiency | | | | |
|---|---|---|---|---|---|---|---|---|---|---|---|
| | | | | | | | >80% | >85% | >90% | >95% | ≥99% |
| F88 | 104 | 39 | 11400 | N | 1.12 | 92 | 10.6 | 5.3 | 1.8 | 0 | 0 |
| F87 | 61 | 40 | 7700 | N | 1.13 | 97 | 5.8 | 3.4 | 2.0 | 0.5 | 0 |
| F77 | 53 | 34 | 6600 | Y | 1.14-1.16 | 97 | 24.9 | 13.6 | 7.9 | 1.6 | 0 |
| F68 | 76 | 29 | 8400 | Y | 1.14-1.15 | >99 | 35.3 | 26.1 | 17.8 | 11.3 | 3.9 |

Figure 4:
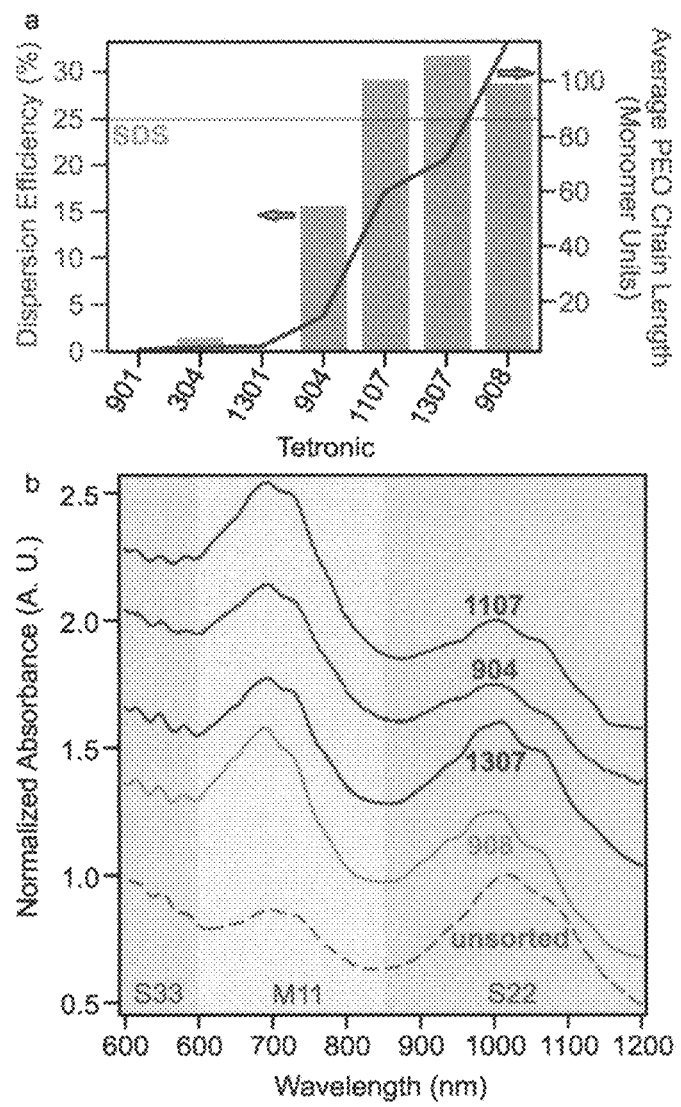
FIGS. 4A-B. Dispersion and separation of SWNTs using Tetronics. A: Plot of the SWNT dispersion efficiency of the Tetronics as a function of average PEO chain length. For PEO segments greater than ~80 monomers in length, the dispersion efficiency of the Tetronics exceeds that of the widely used nanotube surfactant sodium dodecyl sulfate (SDS), which has a dispersion efficiency of 25.0% under identical processing conditions. B: Optical absorbance of the highest purity metallic fractions of Tetronic sorted SWNTs. Normalization to the second-order semiconducting excitations (S22, shaded red) makes increases in the strength of the metallic transitions (M11, shaded blue) readily apparent in comparison to the unsorted SWNT absorbance (dashed gray). Third-order semiconducting transitions (S33) are also shaded red.

[a]Average number of PEO monomers per chain (e.g., a in FIG. 1 is at least about 40, for a Pluronic-type copolymer).
[b]Average number of monomers in PPO chain (e.g., b in FIG. 1 is less than about 35, for a Pluronic-type copolymer).
[c]Mean molecular weight of the polymer in Da as specified by BASF Corp.
[d]Individual buoyant density values correspond to the end of the high purity semiconducting SWNT region while buoyant density ranges correspond to the high purity band of bimodal SWNT density distributions Motivated by the high extraction efficiencies and purities afforded by the Pluronic polymers, a series of DGU separations using Tetronic encapsulated SWNTs was also investigated. Tetronics were selected for study as each half of the X-shaped copolymer structurally resembles a Pluronic with tertiary amine bridging elements as the only notable difference. In these polymers, the hydrophobic PPO groups occupy the center of the surfactant while the hydrophilic PEO chains extend outwards. Despite previous studies of star polymers and the wide use of Pluronics, Tetronic-SWNT dispersions have not been reported previously. Accordingly, the SWNT extraction efficiencies of a series of Tetronics with varying PEO and PPO chain lengths were determined. In agreement with previous Pluronic studies, the SWNT dispersion efficiency of Tetronics depends strongly on PEO length (FIG. 4A). Tetronic 1301 and 901 disperse no SWNTs because of their high hydrophobicity and short PEO chain lengths (~4 monomers long). Tetronics with individual PEO chains longer than an average of 15 monomers show SWNT dispersion efficiencies near or above the level of the widely used anionic surfactant sodium dodecyl sulfate.

DGU separations with the most efficient Tetronics resulted in a noticeable green tint at the top of the SWNT banding region. Optical characterization of the separated SWNT fractions revealed that these SWNTs consist of up to 74% metallic species (FIG. 4B)—a sizeable increase in metallic SWNT content given the roughly one-third metallic distribution of the starting SWNT material. While a variety of structurally different Pluronics survive DGU, the limited number of Tetronics that do not rebundle makes unraveling the relationship between structure and sorting ability difficult (Table 2). The maximum purity a Tetronic can achieve appears weakly dependant on the copolymer size, since both of the Tetronics with the smallest molecular weight achieved greater than 65% pure metallic SWNT fractions while the second smallest Tetronic yielded purities of up to 74%. Sorting efficiency at low purities (50%) directly relates to PEO chain length. Unlike Pluronics, no isolated metallic bands were observed in the Tetronic density gradients after ultracentrifugation. All metallic SWNT enriched regions were located directly above a dark gradient containing unsorted material and SWNT bundles.

TABLE 2

Tetronic metallic SWNT sorting efficiency

| Tetronic | PEO[a] | PPO[b] | MW[c] | Buoyant Density[d] (mg/mL) | Maximum Purity (%) | Met Extraction Efficiency | | | | |
|---|---|---|---|---|---|---|---|---|---|---|
| | | | | | | >50% | >55% | >60% | >65% | >70% |
| 908 | 114 | 21 | 25000 | 1.10 | 63 | 20.0 | 12.0 | 5.9 | 0 | 0 |
| 1307 | 72 | 23 | 18000 | 1.11 | 64 | 19.6 | 9.7 | 3.2 | 0 | 0 |
| 904 | 15 | 17 | 6700 | 1.13 | 67 | 4.9 | 3.0 | 1.9 | 1.2 | 0 |
| 1107 | 60 | 20 | 15000 | 1.11 | 74 | 13.4 | 8.8 | 6.0 | 4.1 | 2.5 |
| 304 | 3.7 | 4.3 | 1650 | | | | | | | |
| 901 | 2.7 | 18.2 | 4700 | | | | | | | |
| 1301 | 4 | 26 | 6800 | | | | | | | |

[a]Average number of PEO monomers per chain (e.g., a in FIG. 1 is at least about 10, for a Tetronic-type copolymer).
[b]Average number of PPO monomers per chain (e.g., b in FIG. 1 is less than about 30, for a Tetronic-type copolymer).
[c]Mean molecular weight of the polymer in Da as specified by BASF Corp.
[d]Individual buoyant density values correspond to the end of the high purity metallic SWNT region Additional Pluronic and Tetronic separations were performed using smaller diameter SWNTs, such as those under the CoMoCAT (~0.8 nm average diameter) and HiPco (~1.0 nm average diameter) trade names. Under the particular parameters utilized, of these, only a HiPco separation in Pluronic F68 showed any degree of enrichment with a small increase in semiconducting SWNT levels. The origin of this diameter dependence in the polymer-SWNT interactions is unclear. Without limitation, such results suggest that certain PPO chains may not adsorb optimally to small diameter SWNTs.

Figure 5:
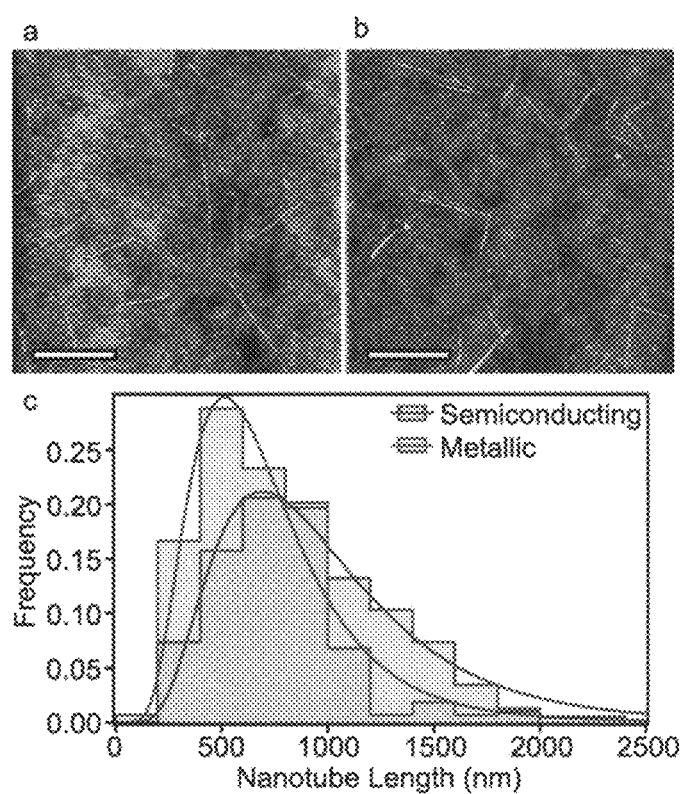
FIGS. 5A-C. AFM images and length distribution data of sorted Pluronic and Tetronic wrapped SWNTs. A, B: Representative 4 μm×4 μm AFM images of semiconducting, Pluronic (A) and partially metallic Tetronic (B) sorted SWNTs on $SiO_2$. C, D: Histograms displaying the length distribution of 204 and 164 individual SWNTs wrapped with Pluronic (C) and Tetronic (D), respectively. The Pluronic sorted SWNTs have a mean length of 916 nm and the Tetronic sorted SWNTs have an average length of 678 nm. Both length distributions are well represented by log-normal distribution functions, shown as solid curves. Scale bars in A and B are 1 μm.

Atomic force microscopy was used to investigate the length distributions of the polymer sorted SWNTs (FIG. 5). Greater than 99% purity semiconducting Pluronic-SWNTs had an average length of 920 nm while 74% metallic purity Tetronic-SWNTs were on average 680 nm long. Both classes of sorted SWNTs are sufficiently long for incorporation into SWNT network electronic devices with reasonable performance. It is unclear what causes the difference in mean lengths between the metallic and semiconducting enriched SWNTs. The structural variations of the Pluronics and Tetronics may cause slightly shorter SWNTs to be encapsulated by the Tetronics. On the other hand, the greater polarizability of the metallic SWNTs makes them more likely to form induced dipoles. This effect could increase the van der Waals forces experienced by metallic SWNTs in bundled form and thereby lead to relatively shorter metallic SWNTs being freed from the bundles during the sonication process.

As discussed, above, and demonstrated by the following examples, nonionic biocompatible block copolymers can be used to separate SWNTs by electronic type using DGU. Greater than 99% semiconducting SWNTs were isolated using the linear block copolymer Pluronic F68, while 74% metallic SWNTs were produced using the X-shaped polymer Tetronic 1107. Detailed studies of multiple Pluronics reveal that the maximum purity of semiconducting SWNTs extracted by such copolymers can be correlated to differences in their hydrophobic and hydrophilic chain lengths, with increasing purity levels obtained for shorter hydrophobic blocks. Furthermore, the successful dispersion and separation of SWNTs using a range of Tetronics illustrate that these copolymers form a promising class of largely unexplored nanotube dispersants.

Such block copolymer-based DGU separations provide a system more amenable to theoretical modeling than previous DGU-compatible surfactants, and should assist in the development of more efficient carbon nanotube separation methods through simulation-driven surfactant design. Moreover, these separation experiments demonstrate how DGU can be utilized to investigate polymer-nanotube interactions as a function of polymer structure and nanotube diameter, electronic type, and/or wrapping angle. The high purity levels and biocompatibility of the SWNTs produced through these separations may lead to their use in various electronics and in vivo applications.

EXAMPLES OF THE INVENTION

The following non-limiting examples and date illustrate various aspects and features relating to the methods, systems and/or compositions of the present invention, including the separation of single-walled carbon nanotubes, as can be accomplished through the methodologies described herein. In comparison with the prior art, the present methods, systems and/or compositions provide results and data which are surprising, unexpected and contrary thereto. While the utility of this invention is illustrated through the use of representative fluid density gradient media and block copolymeric components which can be used therewith, it would be understood by those skilled in the art that comparable results are attainable with various other media and surface active block copolymeric components, as are commensurate with the scope of this invention.

Example 1

Dispersion of SWNTs by ultrasonication. P2 SWNTs synthesized by arc discharge (Carbon Solutions, Inc, batch number 02-376) were added to a 1% w/v block copolymer aqueous solution with a loading of ~1 mg ml$^{-1}$. The solution was subsequently horn ultrasonicated (Fisher Scientific Model 500 Sonic Dismembrator) for 1 hour at 20% of maximum tip amplitude (~10 W). HiPco (Unidym, Inc) and CoMoCAT (Southwest Nanotechnologies, Inc) carbon nanotube solutions were prepared in the identical manner. More generally, SWNT source and preparation would be understood by those skilled in the art, as provided in example 1 of U.S. Pat. No. 7,662,298—such example incorporated herein by reference.

Example 2

Tetronic SWNT dispersion efficiency. Tetronic P2 SWNT solutions were dispersed in the above manner and ultracentrifuged in an SW41 Ti rotor (Beckman Coulter, Inc) for 1 hour at 41,000 rpm and a temperature of 22° C. Following centrifugation, the top 7 mL of supernatant was carefully decanted and characterized using optical absorbance spectroscopy. Tetronic dispersion efficiencies were calculated by comparing the absorption strength of the decanted SWNT dispersion to that of the ultrasonicated SWNTs prior to centrifugation. In particular, dispersion efficiencies were extracted at a wavelength of 1019 nm, which corresponds to the peak absorbance intensity of the P2 SWNT second-order semiconducting optical transitions.

While SWNT dispersion has been demonstrated with various Pluronic and Tetronic tri-block copolymers, it will be understood by those skilled in the art made aware of this invention that various other linear and non-linear amphiphilic multi-block copolymers can be used effectively, in accordance with this invention. Such copolymers and corresponding polymer blocks can be customized by monomer structure, block molecular weight/length and relative content, depending upon copolymer property, SWNT dispersion and desired separation. A wide range of such copolymers are either commercially available (e.g., from BASF Corp.) or can be custom synthesized using known synthetic techniques available in the literature or straight-forward modifications thereof, as would be understood by those skilled in the art made aware of this invention.

Example 3a

Electronic Type Sorting via DGU. SWNTs were sorted by electronic type in density gradients containing a homogeneous 1% w/v polymer loading. Density gradients consisted of the following layers beginning from the bottom of the centrifuge tube: a 4.5 mL, 60% w/v iodixanol (available under the Optiprep trade name) under layer; a 15 mL linear density gradient ranging from 25-45% w/v iodixanol for all block copolymers other than F127, F108, and F98 (which were run in 20-40% w/v iodixanol gradients); 4 mL of 3% w/v iodixanol containing the dispersed SWNTs; and finally a 0% w/v iodixanol over layer. Before being added to the gradient, ultrasonicated SWNT solutions were centrifuged for 5 minutes at 15,000 rpm (Eppendorf Centrifuge 5424) to remove macroscopic SWNT bundles. All centrifuge tubes for block copolymer sorting comparisons were run using a SW 32 Ti rotor (Beckman Coulter, Inc) for 18 hours at 32,000 rpm and a temperature of 22° C. Investigations of polymer loading and SWNT diameter effects were run using scaled down density gradients in an SW 41 Ti rotor. Such separations were carried out over 12 hours at 41,000 rpm and 22° C. With isolation of an identified fraction, iterative, repeated centrifugation, separation and isolation can be used for further enrichment by electronic type (and/or diameter or chirality) as compared to the starting nanotube-copolymer composition.

Example 3b

As understood by those in the art, aqueous iodixanol is a common, widely used non-ionic density gradient medium. However, other media can be used with good effect, as would also be understood by those individuals. More generally, any material or compound stable, soluble or dispersible in a fluid or solvent of choice can be used as a density gradient medium. A range of densities can be formed by dissolving such a material or compound in the fluid at different concentrations, and a density gradient can be formed, for instance, in a centrifuge tube or compartment. More practically, with regard to choice of medium, the carbon nanotubes, whether or not functionalized, should also be soluble, stable or dispersible within the fluids/solvent or resulting density gradient. Likewise, from a practical perspective, the maximum density of the gradient medium, as determined by the solubility limit of such a material or compound in the solvent or fluid of choice, should be at least as large as the buoyant density of the particular carbon nanotubes (and/or in composition with one or more surfactants) for a particular medium.

Accordingly, with respect to this invention, any aqueous or non-aqueous density gradient medium can be used providing the single-walled carbon nanotubes are stable; that is, do not aggregate to an extent precluding useful separation. Alternatives to iodixanol include but are not limited to inorganic salts (such as CsCl, $Cs_2SO_4$, KBr, etc.), polyhydric alcohols (such as sucrose, glycerol, sorbitol, etc.), polysaccharides (such as polysucrose, dextrans, etc.), other iodinated compounds in addition to iodixanol (such as diatrizoate, nycodenz, etc.), and colloidal materials (such as but not limited to percoll). Other media useful in conjunction with the present invention would be understood by those skilled in the art made aware of this invention.

Notwithstanding the preceding and other results described herein, the methods of this invention can be extended to include use of ionic density gradient media. However, even if the nanotubes are stable, such media typically have large water affinities and osmolalities, which can result in dehydration of the nanotubes and their associated surface active components, and may lead to larger effective buoyant densities which may or may not affect separation.

Other parameters which can be considered upon choice of a suitable density gradient medium include, without limitation, diffusion coefficient and sedimentation coefficient, both of which can determine how quickly a gradient redistributes during ultracentrifugation. Generally, for more shallow gradients, larger diffusion and smaller sedimentation coefficients are desired. For instance, percoll is a non-ionic density gradient medium, having a relatively small water affinity compared to other media. However, it has a large sedimentation rate and a small diffusion coefficient, resulting in quick redistribution and steep gradients. While cost can be another consideration, the methods of this invention tend to mitigate such concerns in that media can be repeatedly recycled and reused. For instance, while aqueous iodixanol is relatively expensive as compared to other density gradient media, it can be recycled, with the iodixanol efficiently recovered at high yield, for reuse in one separation system after another.

Example 3c

In principle, any rotor geometry can be used to implement density gradient centrifugation. Representative rotor geometries are commercially available from Beckman-Coulter. Likewise, density gradient and steepness and centrifuge tube dimension can be varied as would be understood by those skilled in the art, without undue experimentation, to enhance and/or optimize any particular SWNT separation. Without limitation, reference is made to examples 8 and 11 of the aforementioned '298 patent, both of which are incorporated herein.

Example 4

Fractionation and Optical Characterization. Fractions were collected in 0.5 mm steps using a piston gradient fractionator (Biocomp Instruments, Inc). Optical cuvettes, diluted to a total volume of 0.850 mL using a 1% w/v block copolymer solution, were characterized by a Varian Cary 5000 spectrophotometer within 24 hours of dilution.

Example 5

Preparation of AFM Samples. Polymer Wrapped Carbon Nanotubes were separated from their polymeric component by deposition onto $SiO_2$ capped silicon wafers functionalized with (3-aminopropyl)triethoxysilane (Sigma-Aldrich) as described in Green, A. A.; Hersam, M. C., Processing and properties of highly enriched double-wall carbon nanotubes. *Nature Nanotech.* 2009, 4, (1), 64-70. Various other polymer removal methods are known in the art, such methods including but not limited to those described in example 16 of the aforementioned '298 patent—such example incorporated herein by reference.

Example 6

AFM imaging and length analysis. AFM images were acquired with a Thermo Microscopes Autoprobe CP-Research AFM operating in tapping mode. Conical AFM probes with a chromium-gold backside coating were used for all measurements (MikroMasch, NSC36/Cr—Au BS). Images of 4 μm×4 μm size were taken to compute the length distributions of Pluronic and Tetronic wrapped SWNTs. Overlapping and highly bundled nanotubes were excluded from the analysis.

As demonstrated above and representative of various other embodiments, this invention can provide the isopycnic separation of SWNTs by electronic type, diameter and/or chirality, using density gradient ultracentrifugation. Benefits relate to the scalable nature and sensitivity of such techniques. As a further consideration, there is no covalent modification of the nanotubes of the sort which can degrade the electronic, optical and/or mechanical properties unique to such a platform. The SWNTs can be separated in size-scales and quantities relevant for subsequent fabrication of a wide range of electronic and opto-electronic devices.

We claim:

1. A method of using a density gradient to separate single-walled carbon nanotubes, said method comprising:
   centrifuging a nanotube composition in contact with a fluid medium comprising a density gradient, said nanotube composition comprising a surface active component selected from linear and X-shaped amphiphilic block copolymers of poly(ethylene oxide) and poly(propylene oxide) and combinations thereof, and a mixture of single-walled carbon nanotubes, said mixture selected from mixed nanotube diameters, mixed nanotube chiralities, mixed nanotube electronic types and combinations of said mixtures; and
   separating said nanotube composition into a plurality of separation fractions, at least one of said separation fractions enriched with single-walled carbon nanotubes of at least one of said selected nanotube diameter, nanotube chirality and nanotube electronic type, said enrichment relative to said nanotube composition.

2. The method of claim 1 comprising isolating at least one separation fraction from said fluid medium.

3. The method of claim 2 comprising repeating said centrifuging, separating and isolating, with at least one of said separation fractions.

4. The method of claim 3 wherein said repetition comprises changing from at least one of a preceding said surface active block copolymer, said fluid medium and said density gradient.

5. The method of claim 2 comprising removal of at least one said surface active block copolymer from said single-walled carbon nanotubes, in at least one said separation fraction.

6. The method of claim 1 wherein said surface active component is a said linear block copolymer and one said separation fraction is enriched with semiconducting single-walled carbon nanotubes.

7. The method of claim 1 wherein said surface active component is a said X-shaped block copolymer and one said separation fraction is enriched with metallic single-walled carbon nanotubes.

8. The method of claim 1 wherein said fluid medium comprises a plurality of aqueous iodixanol concentrations, said density gradient comprising a range of concentration densities.

9. The method of claim 8 wherein said nanotube composition is in contact with said density gradient at a substantially invariant point of said density gradient during said centrifuging, and said invariant point comprises a density approximating a buoyant density of said nanotube composition.

10. A method of using a surface active block copolymer to separate carbon nanotubes, said method comprising:
providing a composition comprising a surface active component selected from linear and X-shaped amphiphilic block copolymers of poly(ethylene oxide) and poly(propylene oxide) and combinations thereof, and a mixture of single-walled carbon nanotubes, said mixture comprising metallic and semiconducting nanotubes;
centrifuging said composition in a fluid medium comprising a gradient density; and
separating said nanotube composition into a plurality of separation fractions, at least one said separation fraction enriched with one of said metallic and semiconducting nanotubes, said enrichment relative to said nanotube composition.

11. The method of claim 10 wherein a hydrophilic component of said copolymer has a length sufficient to inhibit nanotube aggregation during centrifugation.

12. The method of claim 10 wherein said surface active component is a said linear block copolymer and a poly(ethylene oxide) block thereof has a length greater than about 50 monomeric units.

13. The method of claim 12 wherein a poly(propylene oxide) block said linear block copolymer has a length shorter than about 35 monomeric units.

14. The method of claim 12 comprising isolating a separation fraction enriched with semiconducting single-walled carbon nanotubes.

15. The method of claim 10 wherein said surface active component is a said X-shaped block copolymer and a poly(ethylene oxide) block thereof has a length greater than about 10 monomeric units.

16. The method of claim 15 wherein a poly(propylene oxide) block of said X-shaped block copolymer has a length less than about 30 monomeric units.

17. The method of claim 15 comprising isolating a separation fraction enriched with metallic single-walled carbon nanotubes.

18. The method of claim 10 wherein said fluid medium comprises a plurality of aqueous iodixanol concentrations, said density gradient comprising a range of concentration densities.

19. The method of claim 18 wherein a said block copolymer is present at a concentration up to about 1% w/v in said fluid medium, said concentration sufficient to differentiate said carbon nanotube electronic type by buoyant density.

20. A method of using a poly(ethylene oxide) and poly(propylene oxide) block copolymer to separate carbon nanotubes, said method comprising:
providing a composition comprising a surface active component selected from linear block copolymers of a formula

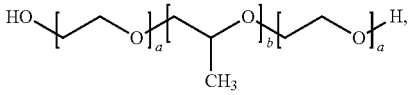

wherein each a is at least about 40 and b is less than about 35, X-shaped block copolymers of a formula

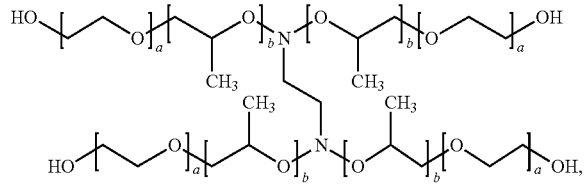

wherein each a is at least about 10 and each b is less than about 30, and combinations thereof; and a mixture of single-walled carbon nanotubes, said mixture comprising metallic and semiconducting nanotubes;
centrifuging said composition in a fluid medium comprising a gradient density; and
separating said nanotube composition into a plurality of separation fractions, at least one said separation fraction enriched with one of said metallic and semiconducting nanotubes, said enrichment relative to said nanotube composition.

21. The method of claim 20 wherein a poly(ethylene oxide) block of a said copolymer has a length sufficient to inhibit nanotube aggregation during centrifugation.

22. The method of claim 20 wherein said surface active component is a said linear block copolymer and each a is greater than about 50.

23. The method of claim 22 comprising isolating a separation fraction enriched with semiconducting single-walled carbon nanotubes.

24. The method of claim 20 wherein a said surface active component is a said X-shaped block copolymer and each a is greater than about 40.

25. The method of claim 24 comprising isolating a separation fraction enriched with metallic single-walled carbon nanotubes.

26. The method of claim 20 wherein said fluid medium comprises a plurality of aqueous iodixanol concentrations, said density gradient comprising a range of concentration densities.

27. The method of claim 26 wherein a said block copolymer is present at a concentration up to about 1% w/v in said fluid medium, said concentration sufficient to differentiate said carbon nanotube electronic type by buoyant density.

* * * * *